July 28, 1959

C. H. HAYNES 2,897,338

METAL MEMBER FUSING DEVICE

Filed Aug. 11, 1953

INVENTOR.

Clyde H. Haynes

July 28, 1959  C. H. HAYNES  2,897,338
METAL MEMBER FUSING DEVICE
Filed Aug. 11, 1953  2 Sheets-Sheet 2
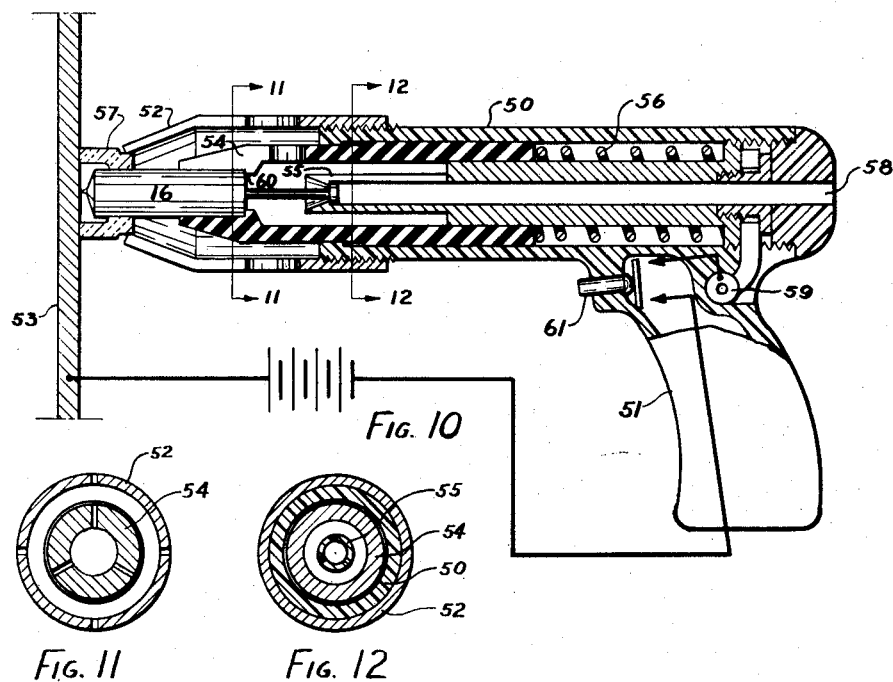
Fig. 10
Fig. 11  Fig. 12
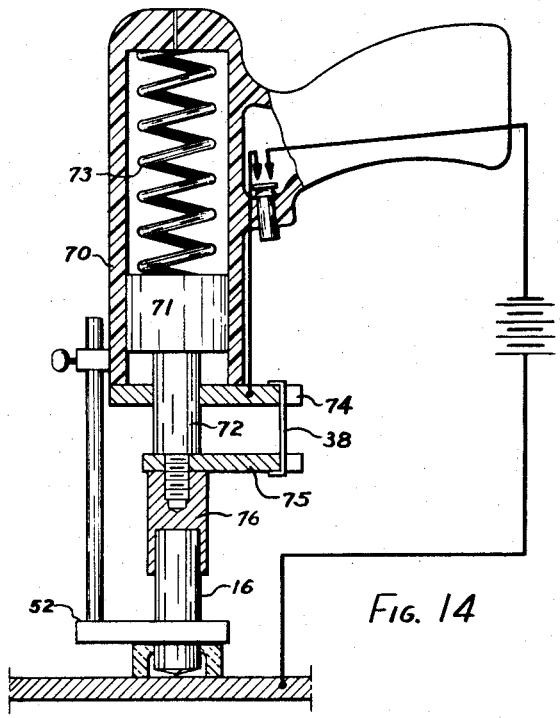
Fig. 14
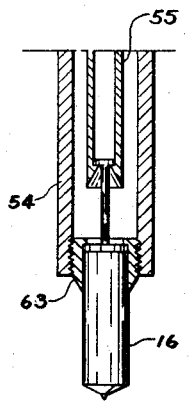
Fig. 13
INVENTOR.
Clyde H. Haynes United States Patent Office 2,897,338
Patented July 28, 1959

2,897,338

METAL MEMBER FUSING DEVICE

Clyde H. Haynes, Elyria, Ohio, assignor, by mesne assignments, to Svenska Aktiebolaget Gasaccumulator Application August 11, 1953, Serial No. 373,605

10 Claims. (Cl. 219—98)

This invention relates to the method and device for controlling the melting of the end of a member by electric current and the moving of that member towards a work piece.

In many of the present methods of uniting a stud or similar member to a work piece, the end of the stud is melted along with a part of the adjacent surface of the work piece. After these opposing portions are melted sufficiently, the stud is moved towards or into the work piece and the molten metal allowed to cool. The quantity of metal which is melted depends on the type of material being joined and the type of joint that is required. For example, in brazing or related types of soldering, the amount of metal actually melted is usually far less than the amount of metal melted during a welding operation. Very often during brazing, the only metal which is actually melted is the end of the stud which is to be fastened to the work piece with the face of the work piece being raised below its melting temperature but to a temperature necessary to produce the joining of the parts.

Various methods and devices are being used for controlling the melting of the metal and the movement of the stud towards the work piece. Some of these devices include large contactors and timing devices, solenoids, and electronic timing devices. A fuse has also been devised for controlling the amount of current used to melt the end of the stud.

In studying all of these devices, it is noted that complex structures are necessary to correlate the advantages of the different parts before the final result of a stud attached to a plate is obtained. The present invention is very simple to manufacture and is easy to operate.

One of the objects of the invention is to provide a device for melting the end of a stud and then moving the stud towards a work piece wherein current flow and movement of the stud are controlled by a single fuse element.

Another object of the invention is to provide a device which has means for urging a stud towards a work piece and a fuse to control this means.

A further object of the invention is to provide a hand gun for attaching a stud to a plate by melting the end of the stud wherein the gun housing contains a unitary control which controls both current flow and movement of the stud into the plate.

A further object of the invention is to provide a stud which includes the means for controlling the current used in melting the end of that stud and the force used to move the stud towards the plate or work piece.

Further objects of the invention will become apparent from studying the simplicity and structural details of both the method and the device as outlined in the following description when taken in conjunction with the drawings in which:

Figure 10 is a cross sectional view of a hand gun for attaching studs having control fuses;

Figure 11 is a view taken along the line 11—11 of Figure 10 with the stud omitted for purposes of clarity;

Figure 12 is a view taken along the line 12—12 of Figure 10;

Figure 13 is a cross sectional view of a modification of the stud and fuse engaging parts of the gun of Figure 10; and Figure 14 is a cross sectional view of a hand gun embodying the principles of the device illustrated in Figure 7.

Throughout the specification and claims, the term stud is used to denote any member which has an end adapted to be attached to a work piece by melting a portion of that end and moving the member into contact with the work piece. The end of the stud which is to be fastened to the work piece may be provided with a suitable cleaning flux, oxidizing agent, or metal having a lower melting temperature than the remaining body part of the stud.

Figures 1, 2:
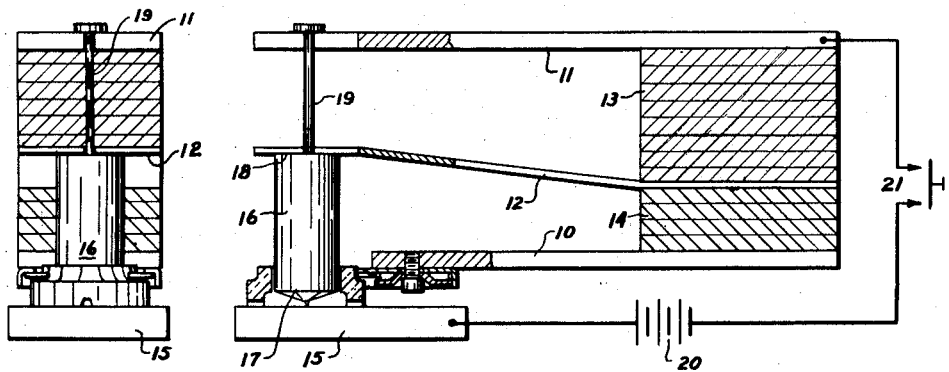
Figure 1 is a plan view of a device embodying the invention.
Figure 2 is an end view of the device illustrated in Figure 1.

The device illustrated in Figures 1 and 2 comprises a base 10, a relatively stiff current conducting bar 11 and a leaf spring 12, electrically isolated and fastened together by insulation blocks 13 and 14. The base 10 is adapted to seat against a work piece 15 to which a stud 16 is to be attached. The stud 16 is described as having a work piece or meltable end 17 and a free end 18 which engages the leaf spring 12. A fuse 19 extending from the free or supporting end 18 through an opening in the spring 12 is attached to the current conducting bar 11. The stud contains the flux necessary to weld it to the plate.

Although other temperature responsive electrical control devices such as thermostats, bimetallic elements, etc., will operate by passing current through them, a fuse is found to be the simplest control for this application. The fuse is a simple form of a temperature responsive device and will operate in welding circuits.

When the stud 16 is first inserted in the device and before current flows through the fuse 19, the spring 12 is cocked or moved into a position wherein it urges the stud 16 towards the work piece 15. The spring 12 is maintained in this position and is controlled by the fuse 19 which holds the spring 12 at a definite spacing from the current conducting bar 11. The fuse is held in tension by the spring 12 until the current melts it and lets it break or separate.

An electrical circuit for melting the end 17 of the stud is formed by connecting a source of electrical current such as battery 20 and a starting switch 21, in series with the current conducting bar 11 and the work piece 15. Closing of the switch 21 causes current to flow through the conducting bar 11, the fuse 19, the stud 16, the meltable end 17, the work piece 15 and the battery 20. This current flows continually to melt the meltable end 17 until the fuse 19 breaks or melts in half. When the fuse 19 breaks, it opens the electrical circuit to stop further melting of the meltable end 17 and simultaneously releases the spring 12. The stud 16 is moved towards the work piece 15 by the spring 12 to form a union between the work piece 15, the melted end 17 and the remainder of the stud 16. In this operation, the fuse 19 has thus both controlled the flow of current and also directly controlled the urging of the study 16 towards the work piece 15 by the spring 12.

Figures 3, 4, 5, 6:
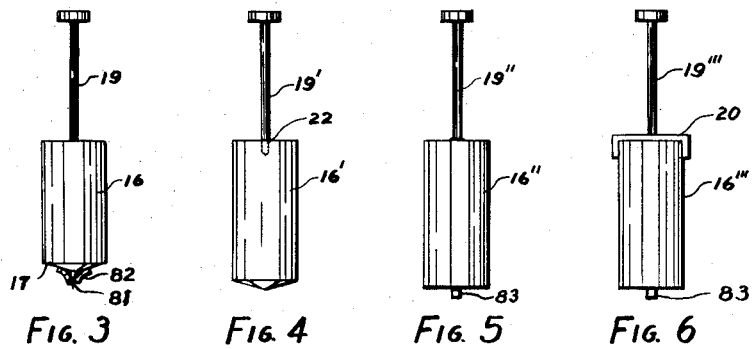
Figures 3, 4, 5 and 6 are plan views of various types of studs having fuses thereon.

Various types of studs having fuses attached to the free end thereof are illustrated in Figures 3 to 6 inclusive. In Figure 3, the fuse is formed as an integral part of the stud. In this instance the fuse 19 and the stud 16 were constructed from a single piece of stock. Thus the fuse 19 is of the same metal as the stud 16.

The stud used in arc welding, wherein an arc is initiated between the end of the stud and the work piece may be provided with a small tip or projection which will flash off when current flows. When such an arc initiating device or tip is used, care must be taken that the projection will flash before the fuse burns through. Such a projection is illustrated in Figure 3 wherein projection or tip 81 pierces a flux ring 82. The tip 81 flashes to initiate an arc and the fuse 19 controls the total flow of current and burns through after the arc has consumed sufficient energy to properly melt the end 17 of the stud 16.

The fuse 19' may also be attached to the stud 16' by drilling a small hole in the free or supporting end and forcing the end of a fuse into the small recess or hole 22 as illustrated in Figure 4.

In Figure 5 the fuse $19^{11}$ is welded or similarly fused to the free end of the stud $16^{11}$ and in Figure 6, the fuse $19^{111}$ is fastened to a cap 20 which slides over the free end of the stud $16^{111}$. A tip of welding flux 83 may be used on the weldable end of the stud as illustrated in Figures 5 and 6. This flux tip 83 will disintegrate before the fuse $19^{111}$ burns out. It is understood that various tips, fluxes, and types of fuses may be used on various studs without departing from the spirit and scope of the invention.

Figure 7:
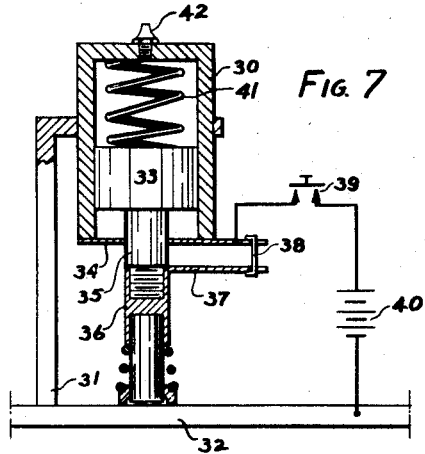
Figure 7 is a plan view of a device adapted to use fuse clips which are separate from the studs.

As an alternative device, the structure of Figure 7 is illustrated. In this illustration, the housing or body 30 having a foot 31 adapted to seat against the work piece 32 supports a piston shaped weight 33. On the end of the housing or body 30 is an apertured current conducting enclosure plate 34 which holds the piston 33 within the body 30 while at the same time allowing the piston 33 to move relative to the body 30. Extending outwardly through the enclosure plate 34 and secured to the piston 33, is a piston rod 35 which carries a stud carrying chuck 36.

Extending parallel to the enclosure plate 34 and electrically insulated and spaced therefrom is an arm 37 for carrying current to the chuck 36 when a fuse 38 electrically joins the arm 37 and the enclosure plate 34. The fuse is held in tension so that it will separate when it melts. The arm is movable with the piston 33 and chuck 36 and relative to the enclosure plate 34 on the body 30. In operating this structure, the current conducting enclosure plate 34 is connected through a switch 39, and a power source such as battery 40 to the work piece 32. When the switch 39 is closed, current flows through the fuse 38, chuck 36 and the stud carried thereby into the work piece 32 until the fuse 38 melts or breaks. At this time, the weight of the piston 33 urges the stud towards the work piece.

For instances such as working overhead where the weight of the piston 33 will not urge or push the stud towards the work piece 32 a spring 41 or other similar resilient material which will urge the piston 33 outwardly of the body 30 is inserted within the body 30 and against the piston 33. If necessary, the body 30 may be also provided with a fluid or gas inlet 42 whereby a pressure may be built up behind the piston 33 to urge it out of the body 30 and towards the work piece 32. It is understood that each of these methods of urging the chuck and a stud carried thereby towards the work piece may be used independently of the other methods or in any combination with any of the other methods.

Figures 8, 9:
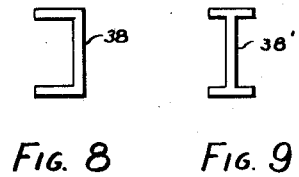
Figures 8 and 9 are plan views illustrating various types of fuse clips.

One of the advantages of this particular design is that the fuse 38 does not have to be attached to the stud. The fuse 38 may be in the shape of a bent wire as illustrated in Figure 8 or in the shape of a stamping or dumbbell $38^1$ as illustrated in Figure 9. The cross section of the fuse may be rectangular or circular as desired.

The features of the present invention may easily be combined in a portable hand gun such as the one illustrated in Figure 10. The gun has a somewhat pistol shape with a barrel or body 50 provided on one end thereof with a handle 51 and on the other end thereof with a foot 52 designed to seat against a work piece 53. The body 50 supports a stud carrying chuck 54 and stationarily supports a fuse engaging chuck 55. Enclosed within the body 50 is a spring for urging the stud carrying chuck 54 outwardly from the body to urge a stud carried thereby away from the foot 52.

The body 50 may be formed of plastic or any other suitable material. However, an electric insulation material is preferred for safety purposes. Similarly, the foot may be formed of any suitable material. In this instance, the foot 52 is of somewhat tubular shape and threaded on to the body 50 to provide an adjustment for various lengths of studs. If desired, the foot 52 may be provided with a ceramic or other refractory ferrule 57 which will seat against the work piece 53.

The stud carrying chuck 54 telescopes over the fuse engaging chuck 55 with the stud engaging chuck 54 preferably being made of an electrical insulating material. In this instance, the fuse engaging chuck 55 is provided with a passageway 58 extending through the length of the gun and opening on the back end thereof. The fuse engaging chuck 55 is constructed of an electrical conducting material since it carries current from a terminal post 59 to the fuse portion of the stud inserted in the stud carrying chuck 54.

In using the gun, a stud having a fuse portion on the free end thereof is inserted, the fused portion first, through the foot and into the stud carrying chuck 54. The stud is pushed into the body until the spring 56 is compressed and the head of the fuse portion of the stud engages in the fuse chuck 55. The stud carrying chuck 54 has a shoulder 60 abutting the free end of the stud to transfer the urging of the spring 56 to the stud. Similarly, the fuse engaging chuck 55 catches the head of the fuse. The fuse thus controls and prevents the spring from pushing the stud outwardly of the gun or towards the work piece until the fuse melts or breaks.

After the stud is inserted in the gun, the foot or in this instance the ferrule 57 is seated against the work piece 53 to make contact between the stud and the plate and the switch 61 is closed to melt the end of the stud and move the stud towards the work piece 53. The switch 61 may be either in the handle 51 of the gun or it may be separate from the gun.

If it is desired to use a fuse which is a separate piece from the stud itself, the stud receiving chuck 54 may be constructed as illustrated in Figure 13. In this instance, the stud receiving chuck 54 is provided with a current conducting bushing 63 which may be threaded into the end of the chuck 54. The bushing 63 may be a split bushing and have resilient properties so that it will tightly grip a stud inserted therein.

A stud and fuse combination as illustrated in Figure 6 or a dumbbell shaped fuse as illustrated in Figure 9 may be used in the gun of Figure 13. The metal part 63 insures contact between the fuse and the stud. Sufficient electrical connection between the fuse and the stud is maintained by this bushing so that current flowing through the fuse will also flow through the stud without creating an arc or high resistance point therebetween. Various inside diameter bushings may be provided for various diameters of studs. In switching from one size stud to another, it will only be necessary to change bushings since the fuses for various sizes of studs will have the same length and will all be insertable into the fuse engaging chuck 55.

In some instances it may be desired to have the fuse entirely on the outside of the hand gun. This may be accomplished by constructing a hand gun such as that illustrated in Figure 14 wherein a cylinder body 70 supports a piston 71 having a piston rod 72. A spring 73 within the body 70 urges the piston 71 outwardly and an enclosure plate 74 prevents the piston 71 from leaving the body 70. Attached to the end of the piston rod 72 is an arm 75 and a stud carrying chuck 76. The arm 75 is easily insulated from the plate 74 by making the piston rod 72 out of an electrical insulation material. A hand gun of this type easily permits use of fuses 38 such as are illustrated in Figures 7, 8, and 9 with the gun operating substantially on the same principle as that illustrated in Figure 7.

In the gun of Figure 14, as in the other designs and devices illustrated, a stud having an end which is to be melted is connected in series or in electrical circuit with a fuse. The device which supports the stud is provided with some type of force exerting means which urges the stud towards the plate and this force exerting means is controlled by the fuse so that it will not urge or move the stud towards the plate or work piece until after the fuse melts. In these designs, the fuse directly and bodily or mechanically controls this movement as well as the amount of current to be used in melting the end of the stud.

Although batteries have been illustrated for supplying power, it is understood that other types of welding current sources such as generators, rectifiers, and transformers may also be used.

The current flows through the fuse which is under tension in each of the variations described. When related to the fuse, the term melt, or melting includes softening of the fuse by heat until it breaks under the tension applied for holding the stud. As soon as the fuse is weakened to where it will no longer hold back the stud, the pusher pushes the stud towards the plate and the weld current is stopped by the breaking or the burning out of the fuse.

It is understood that the present disclosure is for purposes of illustration only and that this invention includes all modifications and equivalents which fall within the scope of the following claims.

What is claimed is:

1. A device for electrically melting the surface of a member and then urging the member towards a workpiece, said device comprising, a support, a carrier movable on said support for holding the member in a definite position next adjacent the workpiece, means urging said carrier to move on the support to move the member towards the workpiece, and a temperature responsive device controlling said means, said temperature responsive device comprising a fuse in electrical series connection with the member and workpiece and mechanically restraining movement of said carrier along said support until the fuse melts.

2. A device for electrically melting the surface of a member and then urging the member towards a workpiece, said device comprising, a member carrier including a piston for holding the member, a cylinder movably supporting said carrier at a desired distance from said workpiece, means urging said carrier to move relative to said cylinder and towards the workpiece, and temperature responsive means comprising a fuse in electrical series connection with the member and workpiece and mechanically restraining movement of said piston along said cylinder until the fuse melts.

3. The device of claim 2 wherein said urging means includes a spring urging the piston out of the cylinder.

4. The device of claim 2 wherein said urging means includes a gas inlet into said cylinder whereby gas may be forced into the cylinder to move the piston.

5. The device of claim 2 wherein said carrier and said body have fuse engaging portions electrically insulated from each other and said temperature responsive means comprises a fuse extending between said portions and mechanically restraining movement of said carrier from said body.

6. In a stud welding device for welding a stud to a plate, a fuse having opposite ends, a current conductor holding one end of said fuse and adapted to be connected to a source of welding current, a stud carrier movable relative to said conductor and holding the opposite end of said fuse, pressure means urging said stud carrier away from said conductor and exerting tension force on said fuse, said fuse melting in response to a predetermined flow of welding current to allow said pressure means to push a stud carried by said stud carrier into the plate and to stop flow of welding current through said fuse.

7. In a stud welding device for welding a current conducting stud consisting of a body portion having a welding end to be welded to a workpiece and a fuse portion terminating in a contact end, said device comprising a current conductor holding said contact end of said fuse portion and adapted to be connected to a source of welding current, a stud pusher movable relative to said conductor and bearing against said body portion of said stud, means urging said pusher and said stud body portion away from said conductor thereby exerting tension force on said fuse portion, said fuse portion melting in response to a predetermined flow of welding current to stop flow of current through said body portion and to permit said means to urge said pusher away from the current conductor to push the stud against the workpiece.

8. A gun for attaching a member to a plate comprising, a barrel seatable against the plate, a member carrying piston slidable in said barrel, a first fuse engager mounted on said barrel and insulated from said piston, a second fuse engager mounted on said piston, resilient means urging said piston outwardly from said barrel, and electrical connection means for connecting said first fuse engager to a source of welding current.

9. The gun of claim 8 wherein said piston includes a current carrying chuck and a fuse electrically connecting the fuse engagers.

10. The gun of claim 8 wherein said first fuse engager has a passage for discharging ends of spent fuses.

References Cited in the file of this patent

UNITED STATES PATENTS

| | | |
|---|---|---|
| 412,599 | Coffin | Oct. 8, 1889 |
| 710,056 | Haskins | Sept. 30, 1902 |
| 1,608,825 | Wagner | Nov. 30, 1926 |
| 1,684,108 | Phelps | Sept. 11, 1928 |
| 2,265,169 | Hughes | Dec. 9, 1941 |
| 2,402,659 | Nelson | June 25, 1946 |
| 2,419,149 | Lodwig | Apr. 15, 1947 |
| 2,455,244 | Evans | Nov. 30, 1948 |
| 2,462,882 | Martin | Mar. 1, 1949 |
| 2,473,871 | Edels | June 21, 1949 |
| 2,474,531 | Keir et al. | June 28, 1949 |
| 2,491,479 | Dash | Dec. 20, 1949 |
| 2,571,313 | Tucker | Oct. 16, 1951 |
| 2,584,491 | Nelson | Feb. 5, 1952 |
| 2,612,394 | Nelson | Sept. 30, 1952 |
| 2,635,167 | Nelson | Apr. 14, 1953 |